Patented Oct. 19, 1948

2,451,871

UNITED STATES PATENT OFFICE 2,451,871

DIMETHYL GERMANIUM DICHLORIDE

Eugene G. Rochow, Schenectady, N. Y., assignor to General Electric Company, a corporation of New York No Drawing. Application August 17, 1946, Serial No. 691,399

1 Claim. (Cl. 260—429)

This invention is a continuation-in-part of my copending application Serial No. 662,625, filed April 16, 1946 (now U. S. Patent 2,444,270, issued June 29, 1948), and assigned to the same assignee as the present invention, which copending application is concerned with a method of preparing organogermanium halides.

This invention relates to new organogermanium halides and more particularly is concerned with novel methyl germanium chlorides corresponding to the general formula $$(CH_3)_n GeCl_{4-n}$$

where $n$ is a whole number equal to at least 1 and not more than 2.

These methyl germanium chlorides have utility as therapeutic agents and as intermediates in the preparation of other organogermanium compounds including organopolygermanoxanes (organogermanium oxides) having the skeletal structure

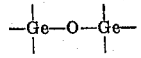

For instance, they may be employed as starting materials for the manufacture of waxy or resinous organogermanium oxides. In addition, hydrolysis products of these methyl germanium chlorides may be used as lubricating media for certain applications.

It was known prior to my invention that various hydrocarbon-substituted germanium halides could be produced. For example, G. T. Morgan and H. D. K. Drew have prepared aryl germanium halides, for example, triphenyl germanium bromide, diphenyl germanium dibromide, phenyl germanium tribromide and phenyl germanium trichloride, by effecting reaction between germanium tetrachloride and a great excess of magnesium phenyl bromide [J. Chem. Soc., 127, 1760 (1925)]. C. A. Kraus and C. L. Brown have prepared diphenyl germanium dichloride by the chlorination of tetraphenylgermanium [J. A. C. S., 54, 3690-6 (1930)]. Trimethyl germanium bromide has been prepared by L. M. Dennis and W. I. Patnode [J. A. C. S., 52, 2779-82 (1930)]. Finally, C. A. Kraus and E. A. Flood obtained triethyl germanium bromide by effecting reaction between germanium tetraethyl and a solution of bromine in ethyl bromide [J. A. C. S., 54, 1635-44 (1932)]. To my knowledge, no one has prepared methyl germanium chlorides of the general formula disclosed above.

The methyl germanium chlorides may be prepared by several methods. One method preferably comprises effecting reaction between germanium and methyl chloride, preferably while the latter is in a vapor state, and more particularly while the said components are intimately associated with a metallic catalyst (for example, copper or silver) for the reaction. For instance, the germanium may be in the form of an alloy thereof with copper or other metal that has a catalytic effect upon the reaction between germanium and the methyl chloride.

One specific method for preparing these methyl germanium chlorides comprises bringing methyl chloride, more particularly, gaseous methyl chloride, into contact with a solid mass containing germanium, for example, a mass of germanium intimately associated with copper, heating the said methyl chloride and germanium-containing mass at a temperature sufficiently high to effect reaction between the methyl chloride and the germanium of the said mass, and recovering the methyl germanium chlorides.

A more specific method for preparing these methyl germanium chlorides comprises causing gaseous methyl chloride to react with germanium intimately associated, as by alloying with copper or other metallic catalyst for the reaction, said reaction being carried out within the temperature range of about 200° to 500° C. or more, and recovering the methyl germanium chlorides; for example, the effluent gaseous products may be cooled by suitable means to obtain a condensate comprising methyl germanium chlorides. More complete directions for preparing these novel compounds may be found in my copending application referred to above of which the instant application is a continuation-in-part.

In order that those skilled in the art may better understand how methyl germanium chlorides may be prepared, the following illustrative examples thereof are given. All parts are by weight.

Example

Approximately 85 parts germanium which had been previously crushed to a fine powder was thoroughly mixed with 21 parts copper powder, and the mixture of powders pressed into a disk under heavy pressure. The disk was broken into small pieces and packed into a glass reaction tube. The tube was heated at a temperature of about 320° to 360° C. while a stream of gaseous methyl chloride was passed through the tube for about 70 hours. The reaction products obtained at the exit end of the tube were condensed in a low-temperature trap. After this time, the mixture of germanium and copper powders was removed from the tube, again pressed into a disk, broken into small pieces, and fired in hydrogen at 705° C. to effect alloying of the mixture. This alloy in turn was broken into small pieces, repacked into the reaction tube and methyl chloride passed over the mass at a temperature of about 320° to 360° C. for approximately 120 hours.

In all, 132 parts of liquid product was obtained. This product was fractionally distilled to yield about 94 parts of a liquid boiling at 124° C., having a melting point of —22° C., a density of 1.488 at 26° C., and a refractive index of 1.4552 at 29° C. This material was identified as being substantially pure dimethyl germanium dichloride as shown by the following analysis:

|  | Theoretical | Found |
|---|---|---|
| Per Cent Chlorine | 40.85 | 40.84 |
| Per Cent Germanium | 41.82 | 41.75 |
| Per Cent Carbon | 13.84 | 13.75 |
| Per Cent Hydrogen | 3.47 | 3.40 |
|  |  | 99.74 |

All the fractions having a chlorine content higher than 41 per cent were combined and fractionated again in a smaller still to yield a compound boiling at 111° C. and having a density of 1.72 at 24.5° C. Analysis of this compound showed it to be substantially pure methyl germanium trichloride ($CH_3GeCl_3$) as evidenced by the following analysis:

|  | Theoretical | Found |
|---|---|---|
| Per Cent Chlorine | 54.3 | 54.9 |
| Per Cent Germanium | 37.4 | 36.9 |

In addition to the aforementioned methyl germanium chlorides, there probably was present a small amount of material containing trimethyl germanium chloride which was difficult to separate. Hydrolysis of the dimethyl germanium dichloride gave an oily phase which dissolved in an excess of water. The solubility of the hydrolysis product in water makes dimethyl germanium dichloride entirely different from dimethyl silicon dichloride (dimethyl dichlorosilane), since hydrolysis of the latter compound leads to a water-insoluble oil.

What I claim as new and desire to secure by Letters Patent of the United States, is:

Dimethyl germanium dichloride.

EUGENE G. ROCHOW.

REFERENCES CITED

The following references are of record in the file of this patent:

UNITED STATES PATENTS

| Number | Name | Date |
|---|---|---|
| 1,639,947 | Kraus et al. | Aug. 23, 1927 |

OTHER REFERENCES

Tchakirian et al.: "Comptes rendus," vol. 201, pp. 835 to 837 (1935).

Horvitz: "Jour. Am. Chem. Soc.," vol. 55, p. 5055 (1933).